US012638680B2

(12) United States Patent
Macken et al.

(10) Patent No.: US 12,638,680 B2
(45) Date of Patent: May 26, 2026

(54) WAVEGUIDE ASSEMBLY

(71) Applicant: Snap Inc., Santa Monica, CA (US)

(72) Inventors: Ian Thomas Macken, Rochester (GB); Rory Thomas Alexander Mills, Rochester (GB)

(73) Assignee: Snap Inc., Santa Monica, CA (US)

( * ) Notice: Subject to any disclaimer, the term of this patent is extended or adjusted under 35 U.S.C. 154(b) by 419 days.

(21) Appl. No.: 18/027,831

(22) PCT Filed: Sep. 8, 2021

(86) PCT No.: PCT/GB2021/052309
§ 371 (c)(1),
(2) Date: Mar. 22, 2023

(87) PCT Pub. No.: WO2022/064170
PCT Pub. Date: Mar. 31, 2022

(65) Prior Publication Data
US 2023/0333383 A1 Oct. 19, 2023

(30) Foreign Application Priority Data

Sep. 28, 2020 (EP) ..................................... 20275151
Sep. 28, 2020 (GB) ..................................... 2015292

(51) Int. Cl.
*G02B 27/01* (2006.01)
(52) U.S. Cl.
CPC .. *G02B 27/0172* (2013.01); *G02B 2027/0123* (2013.01); *G02B 2027/0132* (2013.01); *G02B 2027/0178* (2013.01)
(58) Field of Classification Search
None
See application file for complete search history.

(56) References Cited

U.S. PATENT DOCUMENTS

| | | | | |
|---|---|---|---|---|
| 10,914,950 | B2 * | 2/2021 | Waldern | G02B 27/0179 |
| 2013/0242392 | A1 * | 9/2013 | Amirparviz | G02B 5/3025 |
| | | | | 359/485.05 |

(Continued)

FOREIGN PATENT DOCUMENTS

| | | |
|---|---|---|
| CN | 103562802 A | 2/2014 |
| CN | 107533255 A | 1/2018 |

(Continued)

OTHER PUBLICATIONS

"International Application Serial No. PCT/GB2021/052309, International Search Report mailed Nov. 29, 2021", 3 pgs.

(Continued)

*Primary Examiner* — Jerry Rahll
(74) *Attorney, Agent, or Firm* — Schwegman Lundberg & Woessner, P.A.

(57) ABSTRACT

In various embodiments, a waveguide assembly includes first and second waveguide slabs. The first waveguide slab is to receive image-bearing light and enlarge a pupil size of the light parallel to a first axis. The first waveguide slab includes a first input-coupling device to couple image-bearing light into the first waveguide slab under total internal reflection (TIR), and a first out-coupling region to decouple image-bearing light out of the first waveguide slab by reflection. The second waveguide slab is to couple at least a portion of the out-coupled image-bearing light from the first waveguide slab into the second waveguide slab and enlarge the pupil size parallel to a second axis, which is substantially orthogonal to the first axis. The second waveguide slab includes a diffractive in-coupling region and a transmissive diffractive out-coupling region, through which a user can view real world imagery and the out-coupled image-bearing light simultaneously.

16 Claims, 8 Drawing Sheets

(56) References Cited

U.S. PATENT DOCUMENTS

| | | | | | |
|---|---|---|---|---|---|
| 2013/0300999 | A1* | 11/2013 | DeJong | ............... | H04N 9/3129 |
| | | | | | 351/158 |
| 2016/0041387 | A1* | 2/2016 | Valera | .................. | G02B 6/0055 |
| | | | | | 385/36 |
| 2016/0327705 | A1* | 11/2016 | Simmonds | ......... | G02B 27/0081 |
| 2017/0160548 | A1* | 6/2017 | Woltman | ........... | G02B 27/0172 |
| 2017/0235142 | A1* | 8/2017 | Wall | ......................... | G02B 5/26 |
| | | | | | 359/633 |
| 2017/0299865 | A1* | 10/2017 | Vallius | ............... | G02B 27/4205 |
| 2018/0003892 | A1 | 1/2018 | Ouderkirk | | |
| 2018/0059304 | A1 | 3/2018 | Bhargava et al. | | |
| 2018/0252857 | A1* | 9/2018 | Glik | ......................... | G02B 6/00 |
| 2019/0212557 | A1* | 7/2019 | Waldern | ................. | G02B 6/005 |
| 2020/0183159 | A1 | 6/2020 | Danziger | | |
| 2020/0241304 | A1 | 7/2020 | Popovich et al. | | |
| 2020/0292744 | A1 | 9/2020 | Danziger | | |

FOREIGN PATENT DOCUMENTS

| | | |
|---|---|---|
| CN | 116057452 A | 5/2023 |
| GB | 2599144 A | 3/2022 |
| JP | 6463597 | 1/2019 |
| TW | 202219571 A | 5/2022 |
| WO | WO-2022064170 A1 | 3/2022 |

OTHER PUBLICATIONS

"International Application Serial No. PCT/GB2021/052309, Written Opinion mailed Nov. 29, 2021", 6 pgs.

"International Application Serial No. PCT/GB2021/052309, International Preliminary Report on Patentability mailed Apr. 6, 2023", 8 pgs.

"United Kingdom Application Serial No. 2015292.2, Combined Search and Examination Report mailed Jul. 7, 2021", 6 pgs.

"Korean Application Serial No. 10-2023-7014775, Notice of Preliminary Rejection mailed Feb. 5, 2025", w/ English Translation, 17 pgs.

"Korean Application Serial No. 10-2023-7014775, Response filed Apr. 3, 2025 to Notice of Preliminary Rejection mailed Feb. 5, 2025", w/ English claims, 17 pgs.

"Chinese Application Serial No. 202180062306.8, Office Action mailed Jul. 9, 2025", w/ English Translation, 19 pgs.

"Chinese Application Serial No. 202180062306.8, Response filed Dec. 3, 2025 to Office Action mailed Nov. 1, 2025", w/ English Claims, 17 pgs.

"Chinese Application Serial No. 202180062306.8, Response filed Oct. 16, 2025 to Office Action mailed Jul. 9, 2025", w/ English Claims, 12 pgs.

"Chinese Application Serial No. 202180062306.8, Office Action mailed Nov. 1, 2025", w/ English translation, 7 pgs.

"Korean Application Serial No. 10-2023-7014775, Final Office Action mailed Oct. 31, 2025", w/ English translation, 9 pgs.

* cited by examiner

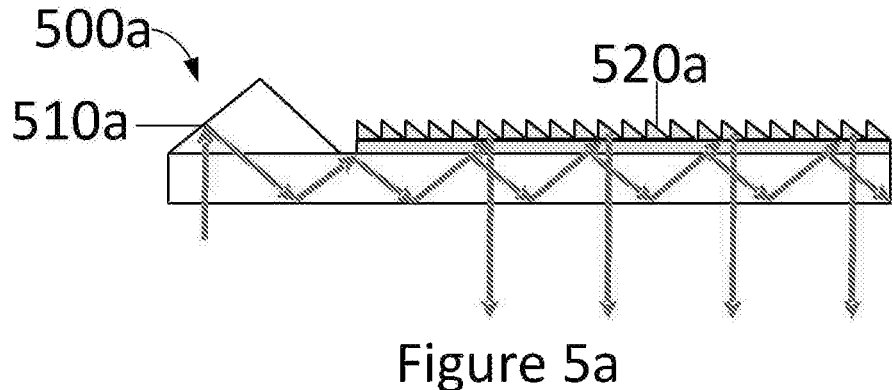
500a
510a
520a
Figure 5a
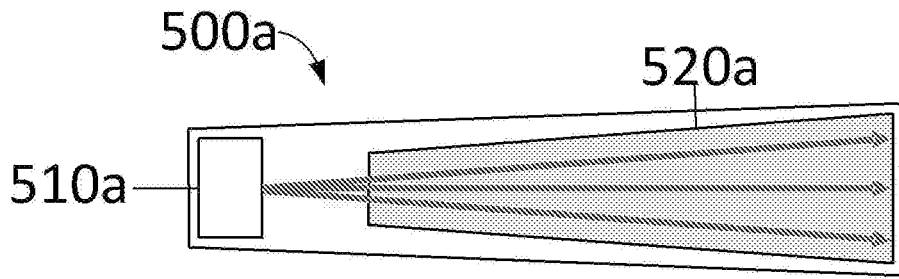
500a
510a
520a
Figure 5b
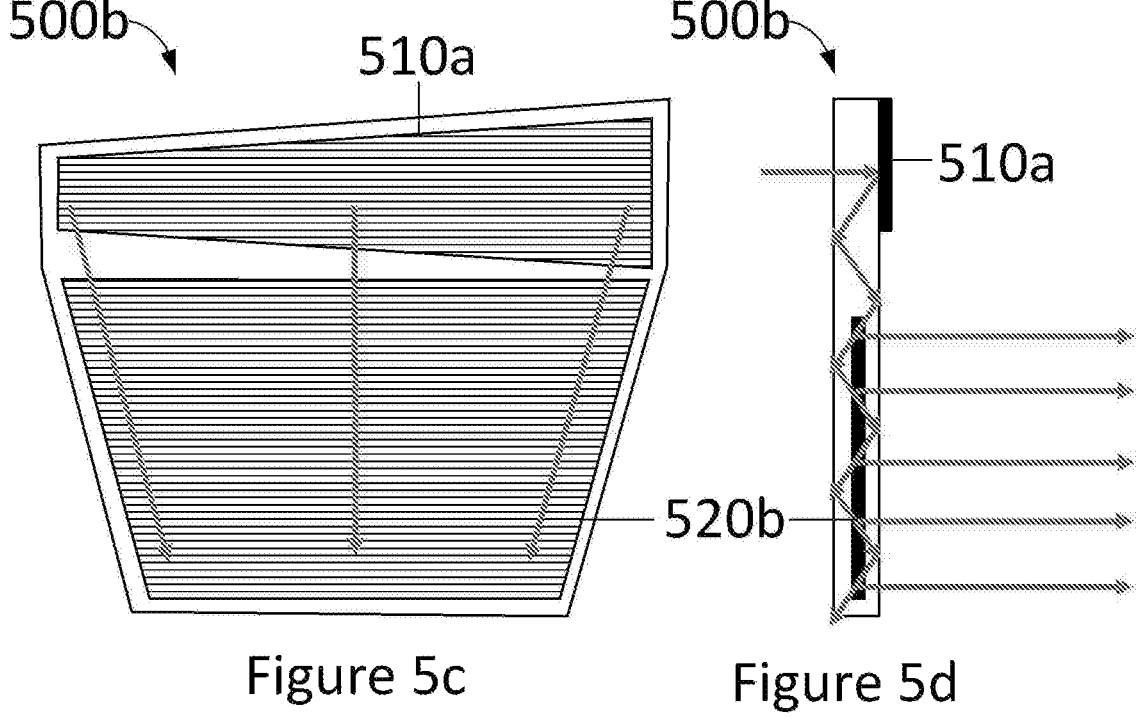
500b
510a
500b
510a
520b
Figure 5c
Figure 5d

600

620

630

610

WAVEGUIDE ASSEMBLY

CLAIM OF PRIORITY

This application is a U.S. national-phase application filed under 35 U.S.C. § 371 from International Application Serial No. PCT/GB2021/052309, filed on 8 Sep. 2021, and published as WO 2022/064170 on 31 Mar. 2022, which claims the benefit of priority to GB Application Serial No. 2015292.2, filed on 28 Sep. 2020, and EP Application Serial No. 20275151.7, filed on 28 Sep. 2020, each of which is incorporated herein by reference in its entirety.

BACKGROUND

It is desirable, for augmented reality applications, for the field of view of the display to be large. Due to the variation in users' physical features it is also desirable for the display to encompass a large exit pupil to allow for generic fitment of the displays and allow for movement of the users eyes with respect to the display surface. In order to reduce the overall size of the optics used to display the images, whilst providing a large FOV and exit pupil, pupil expansion techniques are used.

BRIEF DESCRIPTION OF DRAWINGS

FIG. 5a illustrates a side-on view of a reflective waveguide slab.

FIG. 5b illustrates a top-down view of a reflective waveguide slab.

FIG. 5c illustrates a top-down view of a transmissive waveguide slab.

FIG. 5d illustrates a side-on view of a transmissive waveguide slab.

DETAILED DESCRIPTION

Figure 1:
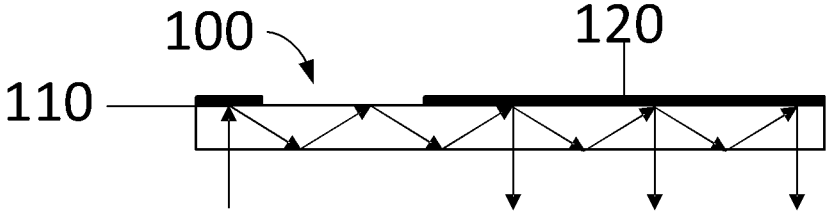
FIG. 1 illustrates a waveguide configured to expand an image-bearing pupil in a single dimension.

Pupil expansion can be achieved using a waveguide 100 comprising a diffraction grating, as illustrated in FIG. 1. The waveguide 100 comprises an input grating 110 and an output grating 120. The output grating is configured to output light out of the waveguide and expand light in a single dimension. A grating is a periodic structure that may splits and diffracts light into different directions. The periodic structures are often known as lines, and shall be referred to as such throughout the description.

Figure 2A:
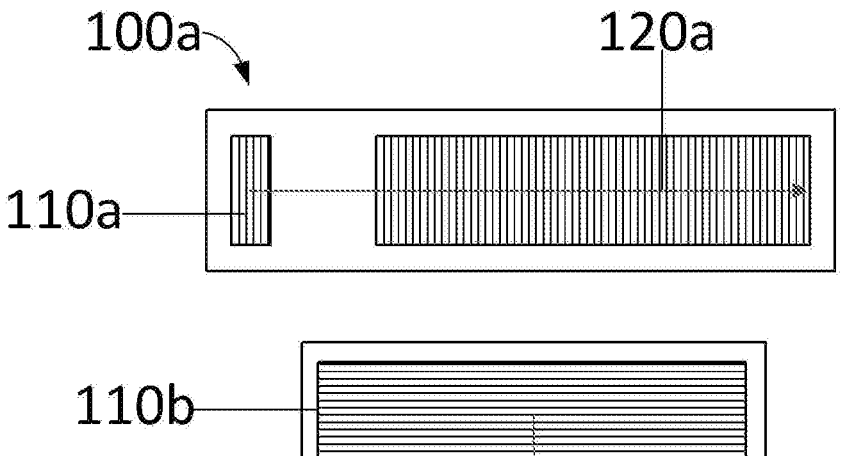
FIG. 2a is an expanded illustration of a waveguide assembly to expand an image-bearing pupil in two dimensions.
Figure 2A:
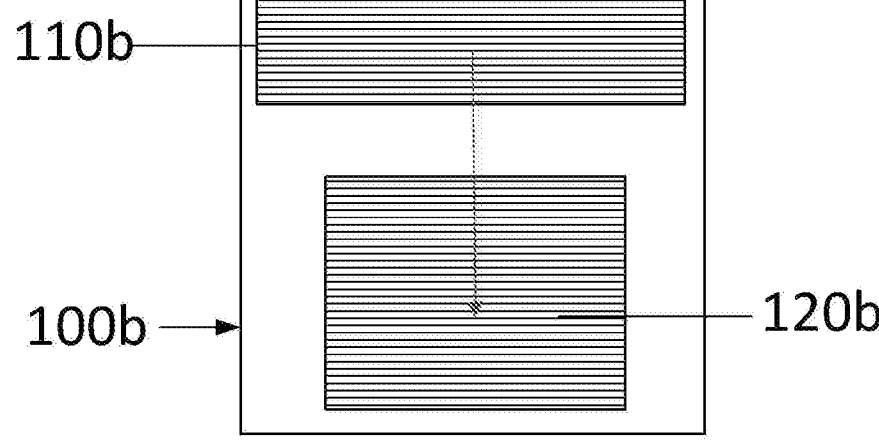

Expansion in two dimensions can be achieved using two orthogonal waveguides, as illustrated in FIG. 2. The grating lines on each waveguide are substantially orthogonal to each other. An input pupil is coupled into the first waveguide 100a using input grating 110a. The input pupil is expanded within and out coupled from the waveguide 100a by the output grating 120a.

The second waveguide 100b is arranged such that the grating lines of the second expansion grating 120b are substantially orthogonal to the grating lines of the first expansion grating 120a and such that light output from the first waveguide by the output grating 120a is coupled into the second waveguide 100b by the input grating 110b. The output grating 120b of the second waveguide 100b is used to expand the pupil in a second direction orthogonal to the first direction and to output the light form the second waveguide.

Figure 2B:
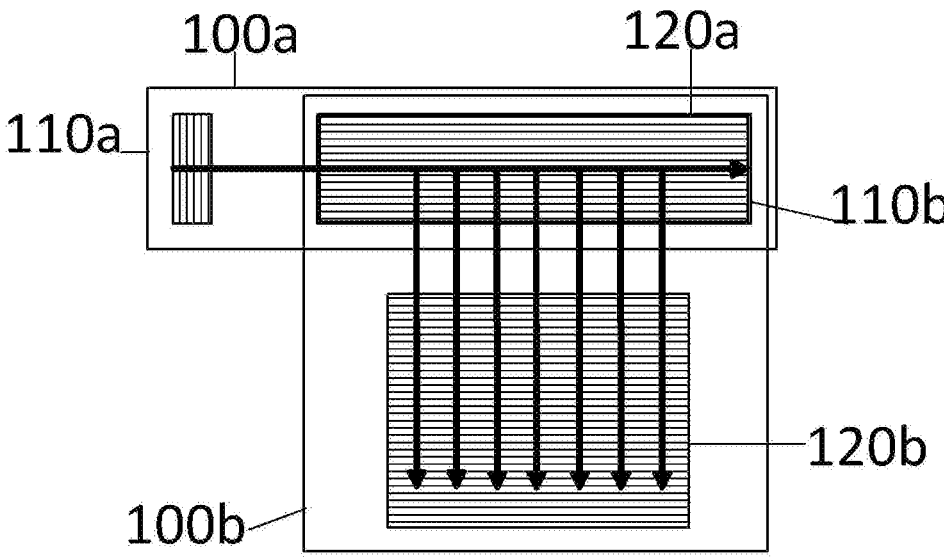
FIG. 2b is an illustration of a waveguide assembly to expand an image-bearing pupil in two dimensions.

The arrangement as shown in FIGS. 2a and 2b is inefficient due to the use of low efficiency gratings used to perform the cross-coupling between the first and the second waveguides. As the arrangement in FIGS. 2a and 2b uses diffraction gratings it also has inherent field of view (FOV) and wavelength bandwidth limitations.

For a single diffractive waveguide, with a fixed pitch input grating, it is difficult to couple a large wavelength range over a large FOV, due to the diffracted angles for certain wavelengths falling outside the TIR conditions of the glass substrate.

Figures 3A, 3B:
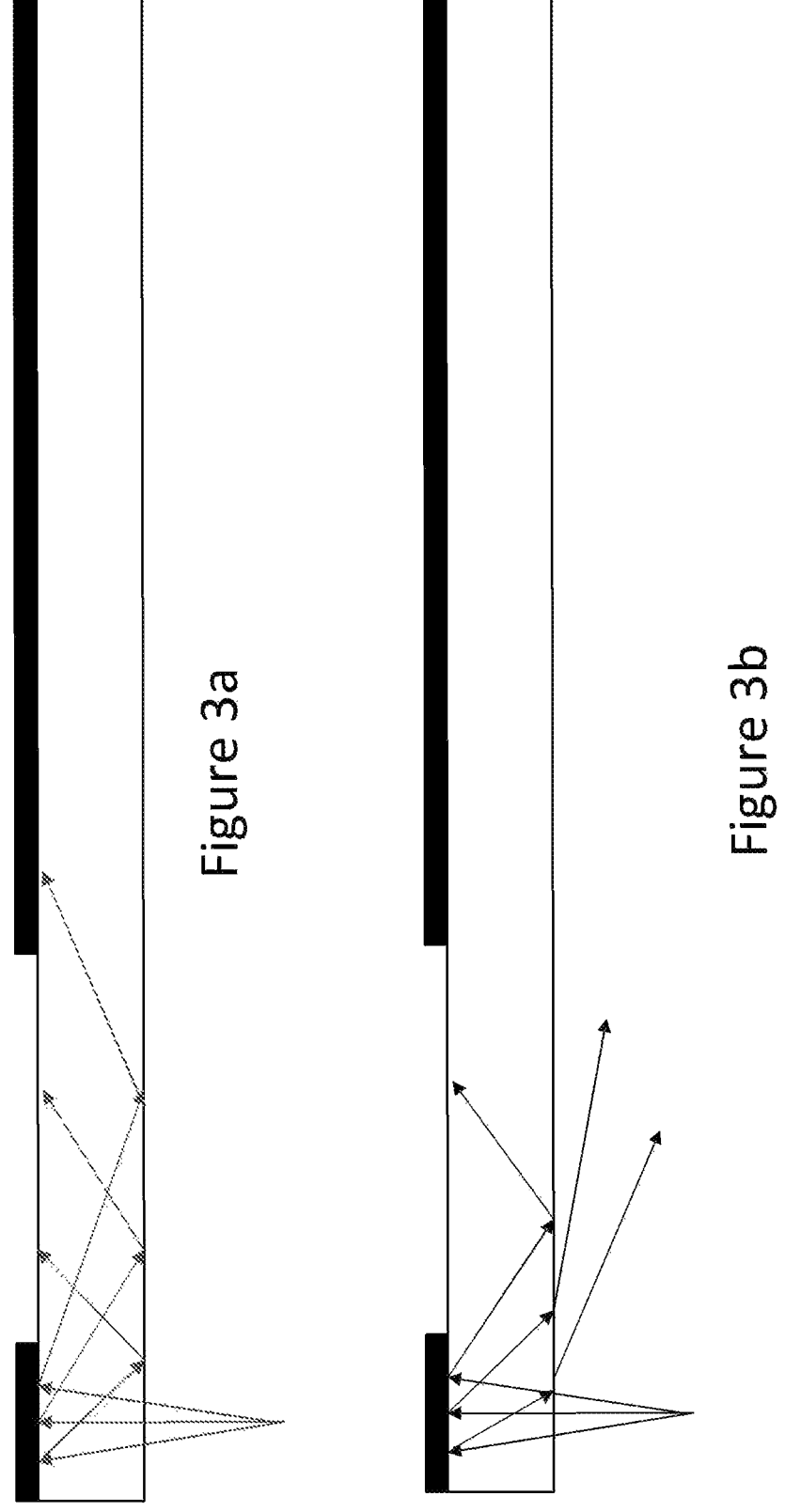
FIG. 3a illustrates a single waveguide, with a fixed pitch grating, with red light coupled into the waveguide.
FIG. 3b illustrates the same single waveguide as FIG. 3a with the same fixed pitch grating, with blue light coupled into the waveguide.

Therefore for a wide FOV image comprising multiple wavelengths (i.e. full colour) multiple stacked waveguides are normally required for both the horizontal expander and vertical expander with this setup. A single waveguide with fixed pitch input grating is shown in FIG. 3a. When red light is input, as shown in FIG. 3a, the full red FOV is coupled under TIR. However, when blue light is input, as shown in FIG. 3b, the blue FOV is mostly ejected as the FOV is not coupled as it cannot be constrained by TIR.

Figure 4:
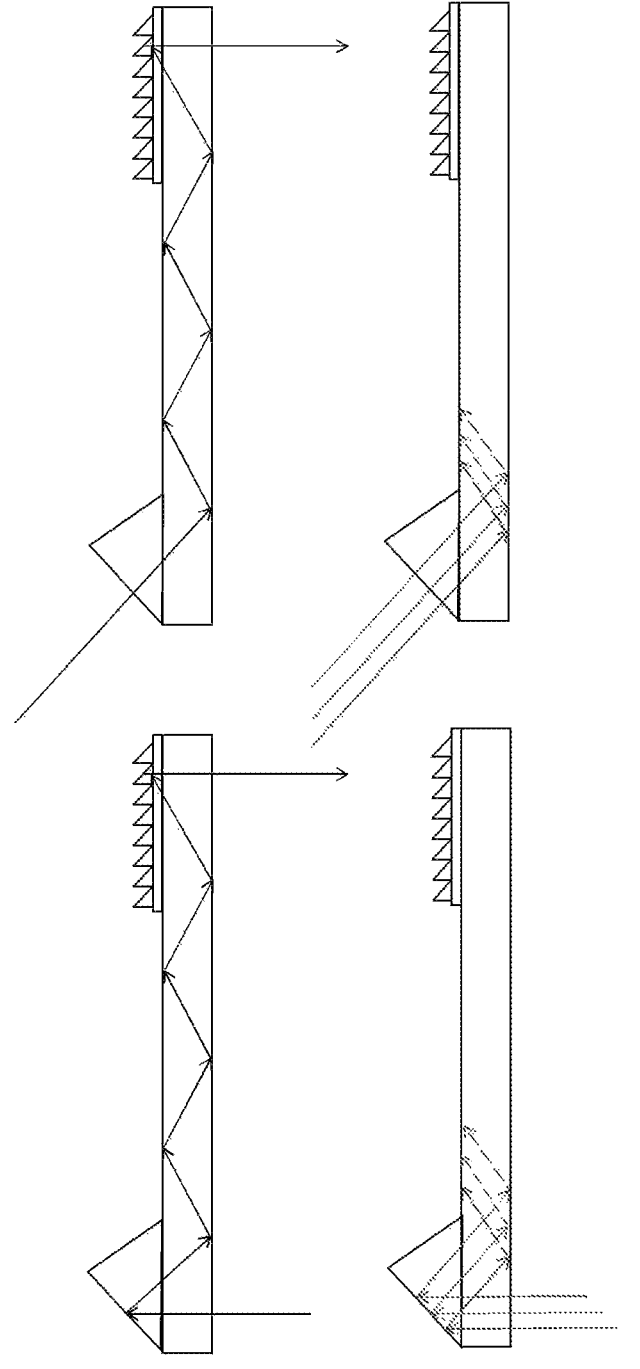
FIG. 4 illustrates a pupil expander that utilizes reflective coupling elements rather than diffractive elements.

An alternative is to utilise a pupil expander that utilizes reflective coupling elements rather than diffractive elements. This is illustrated in FIG. 4.

A waveguide comprising a reflective or transmissive input coupling device such as a prism does not have the same chromatic constraints as a diffraction grating and multiple wavelengths can be coupled over a larger FOV. Therefore a single waveguide can be used to constrain a full colour, wide FOV image under TIR, in contrast to the arrangement of FIGS. 3a and 3b. A reflective output structure attached to the waveguide slab can also output the waveguided light in a more efficient way than a typical diffractive grating.

A reflective output coupler used solely for pupil expansion (i.e. in the case of a horizontal expander) does not have a requirement to be transmissive/see-through so can be coated for high reflection (high efficiency mirror coating), with a graded efficiency to yield a uniform output.

Optimising a reflective out coupling structure to maintain a clear see-through path with minimised artefacts within the visual field can be difficult due to the use of multiple reflective surfaces within the line of sight. In comparison typical diffractive out coupling structures can be optimised to be highly see-through with minimal artefacts, especially when embedded within a glass substrate since the nanometre sized diffractive structures used are unperceivable by the human eye.

Therefore combining a reflective pupil expander with a diffractive pupil expander can yield a combined two dimensional pupil expander which comprises the best qualities of both technologies.

A waveguide assembly 500 according to some examples is described with reference to FIGS. 5a-d. Waveguide assembly 500 comprises a first waveguide slab 500a and a second waveguide slab 500b.

The first waveguide slab 500a is arranged to receive image-bearing light, and enlarge the pupil of the image bearing light parallel to a first axis. The first waveguide slab 500a comprises a first input coupling device 510a arranged to couple light into the first waveguide slab under total internal reflection (TIR). The first waveguide slab 500a also comprises a first output coupling region 520a, arranged to expand the pupil in a direction parallel to a first axis by means of reflection. The first output coupling region 520a also is arranged to couple the image-bearing light out of the first waveguide slab 500a.

The first waveguide slab 500a is illustrated in a side-on view in FIG. 5a, and a top-down view in FIG. 5b.

The second waveguide slab 500b is arranged to couple at least a portion of the out-coupled light from the first waveguide slab 500a into the second waveguide slab 500b, and to expand the image-bearing light in a direction substantially parallel to a second axis. The second axis is substantially orthogonal to the first axis.

The second waveguide slab 500b comprises a diffractive in-coupling region 510b and a transmissive diffractive out-coupling region 520b, through which a user can view real world imagery and the out-coupled image-bearing light simultaneously.

The second waveguide slab 500b is illustrated in a top-down view in FIG. 5c, and a side-on view in FIG. 5d.

The first waveguide slab 500a comprising the first output coupling region 520a using reflective technology can carry a large FOV and spectral range within a single slab arrangement. The first waveguide slab 500a comprising the first output coupling region 520a can be optimised to be highly efficient and graded for uniformity without the requirement to be see-through.

In some examples grading can be performed by varying the size, shape and spacing of the structures, preferably non-linearly.

In some examples the height or depth (e.g. 10's um to 100's um) of the grating may be varied, preferably in the range of 10's μm to 100's μm.

In some examples the spacing between adjacent features may be varied, preferably in the range of 10's μm to 1000's μm. (e.g. 10's um to 1000's um).

In some examples the angles of the blaze face may be varied, preferably in the range of 20 deg to 35 deg.

Gradients of features may be optimised to yield the best output uniformity for a certain setup e.g. dependent upon FOV and output area required.

The second waveguide slab 500b using diffractive technology can be optimised to be highly see-through with minimal see-through artefacts, whilst expanding the vertical pupil over a large area.

In some examples the first input coupling device 510a is attached to the outside of the first waveguide slab 500a. This may allow the first input coupling device 510a to be manufactured separately and bonded or glued to the outside of the first waveguide slab 500a.

In some examples the first input coupling device 510a may comprise a prismatic device, such as a prism or a plurality of prisms. A prismatic input device may be optimised to in-couple a wide range of wavelengths and a large FOV.

In some examples the image-bearing light may be decoupled uniformly across the first out-coupling region 520a.

In some examples at least one of the first waveguide slab 500a and the second waveguide slab 500b may be curved and/or non-planar.

As the user is not required to look through the first waveguide slab 500a, the first waveguide slab 500a or the first output coupling region 520a may be substantially reflective and/or non transmissive.

Figure 6:
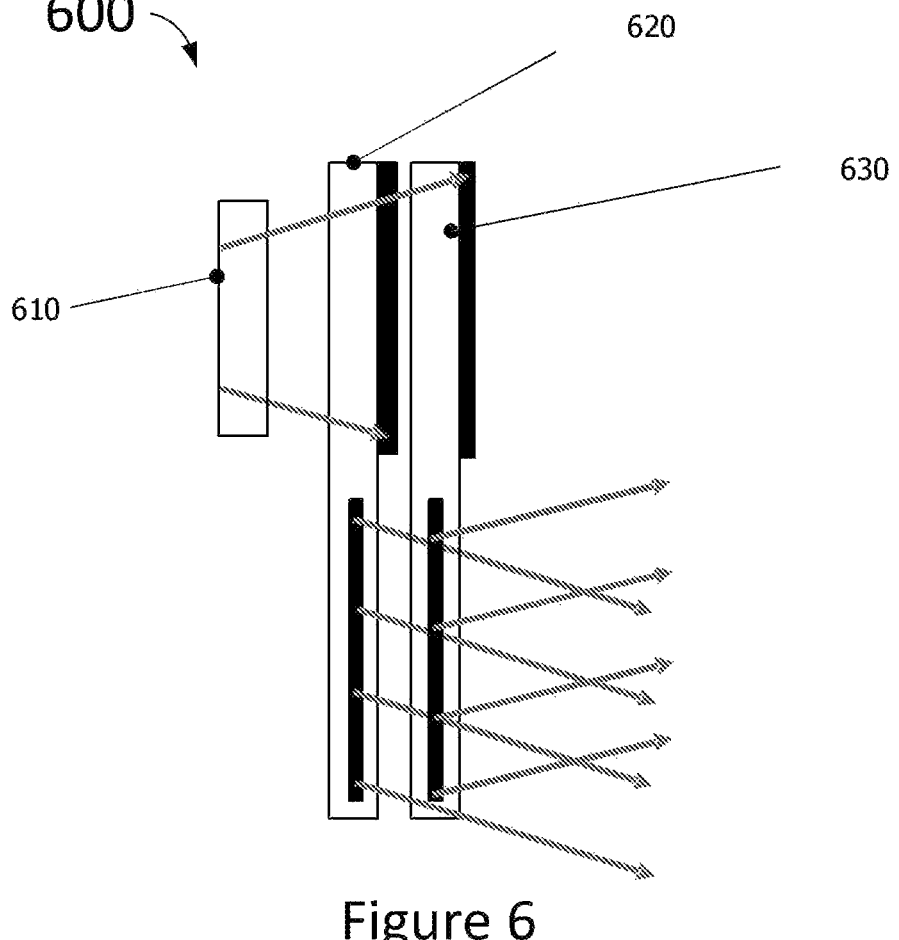
FIG. 6 illustrates a co-planar waveguide arrangement comprising 3 waveguide slabs.

To cater for a wider FOV with multiple wavelengths multiple waveguide slabs similar to second waveguide slab 500b can be used in a co-planar waveguide assembly 600. This is illustrated in FIG. 6. Multiple wavelength waveguide assembly comprises a horizontal waveguide slab 610, a first vertical waveguide slab 620 and a second vertical waveguide slab 630. Horizontal waveguide slab 610 is substantially similar to first waveguide slab 510, and comprises an output coupling region (not shown in FIG. 6), arranged to expand the pupil in a direction parallel to a first axis by means of reflection. The output coupling region also is arranged to couple the image-bearing light out of the horizontal waveguide slab 610 towards the first vertical waveguide slab 620 and the second waveguide slab 630.

The horizontal waveguide slab 610 is arranged to expand the pupil parallel to a first axis. The first vertical waveguide slab 620 and the second vertical waveguide slab 630 are arranged co-planar to the horizontal waveguide slab 610 and are arranged to expand the pupil parallel to a second axis, wherein the second axis is substantially orthogonal to the first axis. The first vertical waveguide slab 620 and the second vertical waveguide slab 630 are offset along a third axis, offset by a minimal gap. The first and second vertical waveguide slabs are substantially similar to the second waveguide slab 500b.

The gap may comprise an air gap, or may be filled with a material such as an optical glue.

In the co-planar waveguide assembly 600 the FOV is effectively split upon ejection from the horizontal waveguide slab 610, due to the optical path undertaken within the horizontal waveguide slab 610. The two vertical waveguide slabs can be arranged to only receive a portion of this FOV and couple it into the respective waveguides. The grating pitch of the two in-coupling gratings on the vertical waveguide slabs will likely be different, as differing grating pitches can be used to optimise coupling efficiency of the differing portions of FOV.

The co-planar waveguide assembly 600 may also comprise more than two vertical waveguide slabs.

In some examples at least one of the horizontal waveguide slab 610, first vertical waveguide slab 620 and the second vertical waveguide slab 630 may be curved and/or non-planar.

In some examples at least one of the first waveguide slab 500a and the second waveguide slab 500b may be formed from one or more substrates bonded together. Optical coatings may be included between these bonded substrates.

In some examples the optical coating may comprise a beam splitting coating. A beam splitting coating splits light into a transmitted and reflected component. Beam splitting coatings are typically formed from low and high index dielectric materials (e.g. MgF2, SiO2, TiO2) or metallic materials (e.g. Al, Ag).

If the beam splitting coating is placed between substrates or slabs of non-equal thickness (e.g. substrate 1 is 1 mm thick and substrate 2 is 2 mm thick) then the rays start to get split multiple times resulting in many generations of rays being generated from a single source ray. This is illustrated in FIGS. 7*a-b* and 8*a-b.*

Figures 7A, 8A:
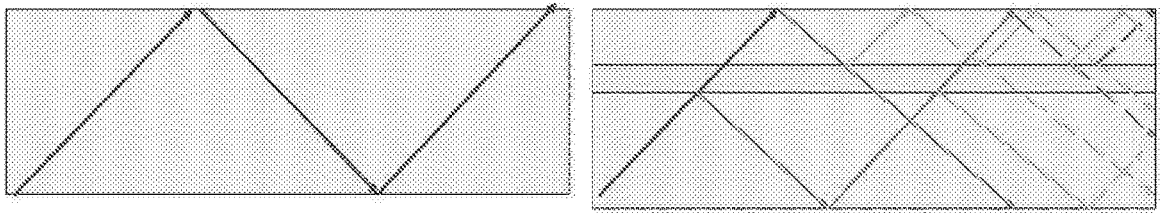
FIG. 7a illustrates a single ray under TIR in a waveguide.
FIG. 8a illustrates a single ray confined in a waveguide comprising two waveguide slabs bonded together.

In FIG. 7*a* a single ray propagates along the waveguide slab under TIR. When the ray is output from the waveguide slab, as shown in FIG. 7*b,* there are gaps between the output rays.

In FIG. 8*a* two waveguide slabs of different thickness are bonded together using a beam splitting coating. The single ray interacts with the beam splitting coating, and is split into a transmitted beam and a reflected beam. The subsequent reflected and transmitted beams also interact with the beam splitting coating. This process is repeated multiple times.

Figures 7B, 8B:
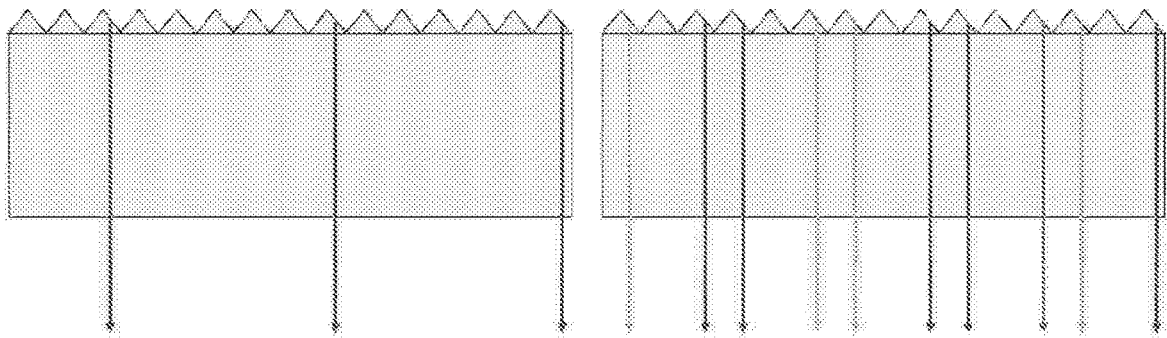
FIG. 7b illustrates the single ray coupled out of the waveguide.
FIG. 8b illustrates the single ray output from the waveguide comprising two waveguide slabs bonded together.

When the light is emitted from the waveguide slab, as shown in FIG. 8*b,* the gaps between the pupils are reduced in comparison to the example of FIG. 7*b.*

FIG. 6 illustrates light passing through first vertical waveguide slab 620 before being input into second vertical waveguide slab 630. However, in some examples light input into second vertical waveguide slab 630 may be input into the second waveguide slab 630 in a direct optical path from the horizontal waveguide slab 610. A direct optical path refers to the fact that the light does not interact with other elements before being input into the second vertical waveguide slab 630. The light may subsequently interact with the first vertical waveguide 620, for example if the first waveguide slab 620 and the second waveguide slab are bonded together as described with relation to FIGS. 8*a* and 8*b.*

Figure 9:
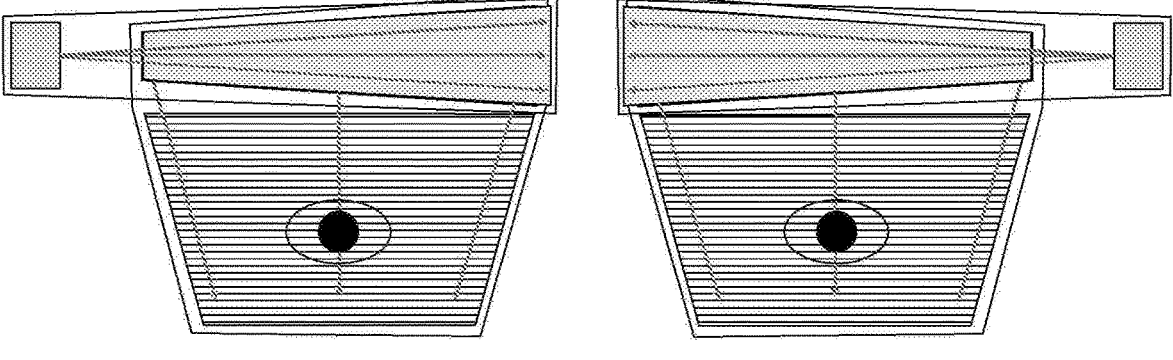
FIG. 9 illustrates a binocular arrangement.
Figure 10:
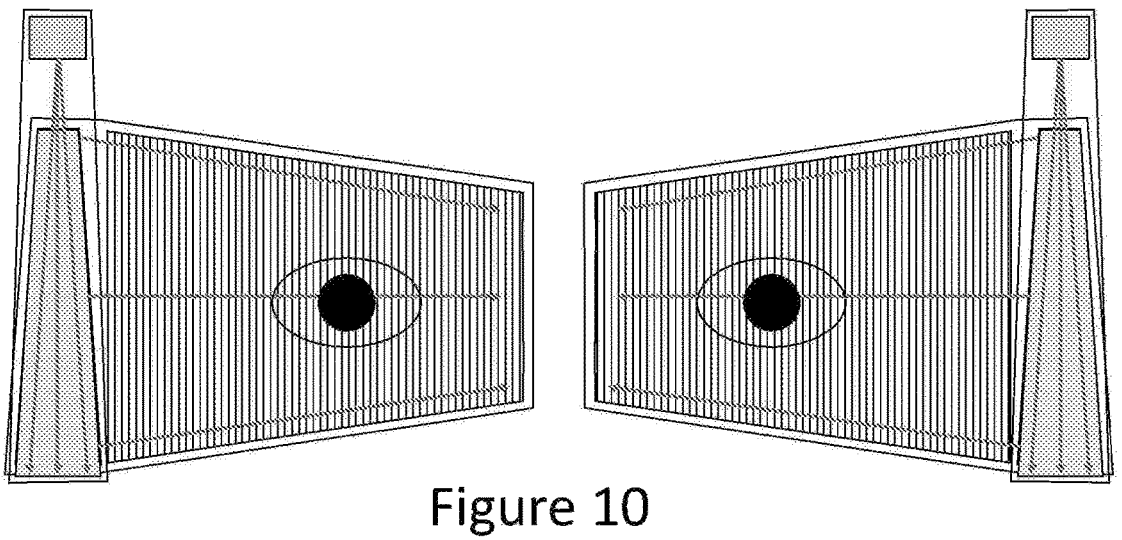
FIG. 10 illustrates an alternative binocular arrangement.

Multiple separate waveguide assemblies may be used to provide a binocular assembly, as illustrated in FIGS. 9 and 10. In the arrangement shown in FIG. 9 the reflective waveguide slabs are arranged above the eyes of the user. In an alternative arrangement shown in FIG. 10 the reflective waveguide slabs are arranged to the side of the user's eyes.

In some examples the arrangements shown in FIGS. 9 and 10 may be used as augmented reality glasses. In some examples the arrangements shown in FIGS. 9 and 10 may be used in a head mounted display or head up display.

The invention claimed is:

1. A waveguide assembly comprising:
a first waveguide slab, arranged to receive image-bearing light and enlarge a pupil size of the image-bearing light parallel to a first axis, the first waveguide slab comprising a first input coupling device arranged to couple image-bearing light into the first waveguide slab under total internal reflection (TIR), and a first out-coupling region arranged to decouple image-bearing light out of the first waveguide slab by means of reflection;
a second waveguide slab, arranged to couple at least a portion of out-coupled image-bearing light from the first waveguide slab into the second waveguide slab and enlarge the pupil size parallel to a second axis, the second axis being substantially orthogonal to the first axis, the second waveguide slab comprising a diffractive in-coupling region and a transmissive diffractive out-coupling region, arranged such that a user can view real world imagery and the out-coupled image-bearing light simultaneously; and
a third waveguide slab arranged to couple, under TIR into the third waveguide slab, image-bearing light from the first waveguide slab not coupled into the second waveguide slab, the third waveguide slab comprising a transmissive diffractive out-coupling region, through which the user can view real world imagery and the out-coupled image-bearing light simultaneously, the second waveguide slab being between the first waveguide slab and the third waveguide slab, light coupled into the third waveguide slab being input into the third waveguide slab in a direct optical path from the first waveguide slab that does not pass through the second waveguide slab, such that the light does not interact with the second waveguide slab before being input into the second waveguide slab.

2. The waveguide assembly according to claim 1, wherein the first out-coupling region is coupled to an outer surface of the first waveguide slab.

3. The waveguide assembly of claim 1, wherein the image-bearing light is to be decoupled substantially uniformly across the out-coupling region.

4. The waveguide assembly of claim 1, wherein the first input coupling device comprises a prismatic device.

5. The waveguide assembly of claim 1, wherein the first out-coupling region is selected to have at least one optical characteristic selected from optical characteristics of being substantially fully reflective and being substantially non-transmissive.

6. The waveguide assembly according to claim 1, wherein light coupled into the third waveguide slab is configured not to interact with the second waveguide slab before being input into the second waveguide.

7. The waveguide assembly according to claim 1, wherein the in-coupling region of the second waveguide slab and the in-coupling region of the third waveguide slab have different grating pitch sizes that are dissimilar to one another.

8. The waveguide assembly according to claim 1, wherein the third waveguide slab is substantially coplanar with the second waveguide slab in the first axis and second axis and offset in a third axis, the third axis being substantially orthogonal to the first axis and the second axis.

9. The waveguide assembly according to claim 1, wherein the second waveguide slab and the third waveguide slab are bonded together.

10. The waveguide assembly according to claim 1, wherein the second waveguide slab and the third waveguide slab are different thicknesses.

11. The waveguide assembly according to claim 1, wherein the second waveguide is selected to have at least one physical shape chosen from shapes including a curved shaped and a non-planar shape.

12. The waveguide assembly according to claim 1, wherein the first waveguide slab is arranged to receive collimated image-bearing light.

13. The waveguide assembly according to claim 1, further comprising a collimating device to output a collimated exit pupil to be received by the first waveguide.

14. A binocular arrangement, comprising:
a first waveguide assembly to provide a first image to a first eye of a user, and a second waveguide assembly to provide a second image to a second eye of a user, each waveguide assembly comprising:
a first waveguide slab, arranged to receive image-bearing light and enlarge a pupil size of the image-bearing light parallel to a first axis, the first waveguide slab comprising a first input coupling device arranged to couple image-bearing light into the first waveguide slab under total internal reflection (TIR), and a first out-coupling region arranged to decouple image-bearing light out of the first waveguide slab by means of reflection;

a second waveguide slab, arranged to couple at least a portion of the out-coupled image-bearing light from the first waveguide slab into the second waveguide slab and enlarge the pupil size parallel to a second axis, the second axis being substantially orthogonal to the first axis, the second waveguide slab comprising a diffractive in-coupling region and a transmissive diffractive out-coupling region, arranged such that the user can view real world imagery and the out-coupled image-bearing light simultaneously; and a third waveguide slab arranged to couple, under TIR into the third waveguide slab, image-bearing light from the first waveguide slab not coupled into the second waveguide slab, the third waveguide slab comprising a transmissive diffractive out-coupling region, through which the user can view real world imagery and the out-coupled image-bearing light simultaneously, the second waveguide slab being between the first waveguide slab and the third waveguide slab, light coupled into the third waveguide slab being input into the third waveguide slab in a direct optical path from the first waveguide slab that does not pass through the second waveguide slab, such that the light does not interact with the second waveguide slab before being input into the second waveguide slab.

15. The binocular arrangement of claim 14, wherein the binocular arrangement comprises augmented reality glasses.

16. A head-mounted display or a head-up display, comprising:

a first waveguide slab, arranged to receive image-bearing light and enlarge a pupil size of the image-bearing light parallel to a first axis, the first waveguide slab comprising a first input coupling device arranged to couple image-bearing light into the first waveguide slab under total internal reflection (TIR), and a first out-coupling region arranged to decouple image-bearing light out of the first waveguide slab by means of reflection;

a second waveguide slab, arranged to couple at least a portion of the out-coupled image-bearing light from the first waveguide slab into the second waveguide slab and enlarge the pupil size parallel to a second axis, the second axis being substantially orthogonal to the first axis, the second waveguide slab comprising a diffractive in-coupling region and a transmissive diffractive out-coupling region, arranged such that a user can view real world imagery and the out-coupled image-bearing light simultaneously; and a third waveguide slab arranged to couple, under TIR into the third waveguide slab, image-bearing light from the first waveguide slab not coupled into the second waveguide slab, the third waveguide slab comprising a transmissive diffractive out-coupling region, through which the user can view real world imagery and the out-coupled image-bearing light simultaneously, the second waveguide slab being between the first waveguide slab and the third waveguide slab, light coupled into the third waveguide slab being input into the third waveguide slab in a direct optical path from the first waveguide slab that does not pass through the second waveguide slab, such that the light does not interact with the second waveguide slab before being input into the second waveguide slab.

* * * * *